(12) United States Patent
Isaman

(10) Patent No.: US 6,449,710 B1
(45) Date of Patent: Sep. 10, 2002

(54) STITCHING PARCELS

(75) Inventor: David L. Isaman, San Diego, CA (US)

(73) Assignee: STMicroelectronics, Inc., Carrollton, TX (US)

(*) Notice: Subject to any disclaimer, the term of this patent is extended or adjusted under 35 U.S.C. 154(b) by 0 days.

(21) Appl. No.: 09/429,053

(22) Filed: Oct. 29, 1999

(51) Int. Cl.$^7$ ................................................. G06F 9/38
(52) U.S. Cl. .................... 712/216; 712/217; 712/218
(58) Field of Search ................................ 712/216, 217, 712/218, 226

(56) References Cited

U.S. PATENT DOCUMENTS

| | | | |
|---|---|---|---|
| 5,129,070 A | * | 7/1992 | Dorotte |
| 5,630,149 A | * | 5/1997 | Bluhm ........................ 712/217 |
| 5,632,023 A | * | 5/1997 | White et al. ................. 712/218 |
| 5,737,629 A | * | 4/1998 | Zuraski, Jr. et al. .......... 712/23 |
| 5,751,984 A | * | 5/1998 | Chang et al. ................. 712/216 |
| 5,768,556 A | * | 6/1998 | Canada et al. ............... 712/216 |
| 5,911,057 A | * | 6/1999 | Shiell ........................ 712/217 |
| 5,930,521 A | * | 7/1999 | Tien et al. ..................... 712/23 |
| 5,937,178 A | * | 8/1999 | Bluhm ........................ 712/218 |
| 5,983,342 A | * | 11/1999 | Tran ............................ 712/218 |
| 6,047,369 A | * | 4/2000 | Colwell et al. .............. 712/217 |
| 6,108,769 A | * | 8/2000 | Chinnakonda et al. ....... 712/216 |

* cited by examiner

Primary Examiner—William M. Treat
(74) Attorney, Agent, or Firm—Lisa K. Jorgenson; William A. Munck

(57) ABSTRACT

The invention provides a method and system for performing instructions in a microprocessor having a set of registers, in which instructions which operate on portions of a register are recognized, and "stitching" instructions are inserted into the instruction stream to couple the instructions operating on the portions of the register. The "stitching" parcels are serialized along with other instruction parcels, so that instructions which read from or write to portions of a register can proceed independently and out of their original order, while maintaining the results of that out-or-order operation to be the same as if all instructions were performed in the original order. In a preferred embodiment, the choice of stitching parcels is optimized to the Intel x86 architecture and instruction set.

25 Claims, 6 Drawing Sheets

STITCHING PARCELS

BACKGROUND OF THE INVENTION

1. Field of the Invention

The invention relates to microprocessors.

2. Related Art

In the design of processors, and particularly microprocessors, one important goal is speed; it is desirable that the microprocessor perform as many instructions as possible in a unit time. Therefore, it has become known in the art of microprocessor design to provide for performing multiple instructions at once, and to provide for performing instructions out of their original order as specified by the programmer. However, while instructions are sometimes performed "out of order", it is necessary to cause the result of the out-or-order operation to be the same as if they were performed in the original order.

All microprocessors, including those that execute out of order, include a register file that stores the contents of each register manipulated by the program. In a conventional, in-order implementation, the result of executing an instruction is written to the register file immediately upon execution of the instruction. Performance of an out-of-order implementation, however, could result in an inconsistent register file content at any instant in time. For example, consider an instruction A that is followed by an instruction B in a program. If execution of instruction A causes an exception, then program execution will be automatically re-directed to an exception handler program. At the entry to the exception handler program, it is typically expected that execution has ceased just prior to the execution of instruction A; therefore, the register file is not expected to have been updated by executing instruction A or any following instruction, including instruction B.

In an out-of-order implementation, instruction B may actually be executed before instruction A. However, in order to obey the expected in-order behavior described above, the updating of the register file by instruction B must be postponed. Since the result of executing instruction B cannot be written to the register file immediately, it is written first to a different memory, variously known in the art as a reorder buffer or a result shelf.

Every instruction in an out-of-order implementation goes through a final step of retirement. This step consists of reading the result of the instruction execution out of the result shelf and writing that result into the register file. All instructions must be retired in the order specified by the program. Thus, an instruction B is not retired until instruction A (and all intervening instructions) have been (1) executed, (2) determined not to cause exceptions and (3) retired to the register file.

Out-of-order execution is driven by dependencies between instructions. When an instruction C is first decoded, the instructions on which it depends are identified as the instructions that most recently wrote to all of the operand registers that instruction C reads. Instruction C can be executed when all instructions on which it depends for operand values have been executed. The most recent instruction that wrote to a register that is an operand of C is known as the locker of that operand. When C is ready for excution, each of its operands may be found either in the register file (if the locker instruction has retired) or in the result shelf in the location where the operand locker's result was first written.

A major challenge in designing an out-of-order microprocessor is determining if an instruction's operand needs to be read from the result shelf, and if so, from where in the result shelf. A first examination of an instruction C includes determining whether the locker of each operand of C has retired. If the locker has not retired, then some identification of that locker is stored with C until such time as C is executed. This identification is then used to find the operand value in the result shelf.

Some microprocessor architectures and instruction sets aggravate the problem of managing lockers. This is particularly true of systems which provide instructions and parcels that write to only a portion of a register (notably the Intel x86 architecture and instruction set). Thus, while in the usual case, each operand register read by an instruction C was written in its entirety by a single preceding locker instruction, it may be the case that a register contains results written by two or three preceding instructions, each of which wrote to a different portion of that register.

One known solution is to break up each register into multiple logical registers, and to record a separate locker for each portion of the operand register which can be written to with each instruction operand. Thus, a first instruction D which writes to a first portion of some register would set a separate lock from a second instruction E, which writes to a second portion of the register. This informs a subsequent instruction F (F reading the entire register) of the locations in the result shelf for the values for the individual portions While this method achieves the purpose of allowing such instructions to be executed as soon as all their dependencies have been satisfied, and therefore can speed up operation of the microprocessor, it has the drawback that it requires the storage of a much larger number of lockers per operand, with consequent use of more resources (such as circuit area) devoted to such locks.

A second solution for correct execution of example instruction F, is to delay its execution until both instructions D and E have retired. There is no concern for fetching different portions from different result shelf locations because both portions of the register file entry for the operand register have been updated with the result values of D and E. However, this solution results in reduced performance, due to the delay in executing instruction F.

Accordingly, it would be desirable to provide a method and system so that an instruction F can be executed without waiting for instructions D and E to retire, while requiring that only one locker to be stored with each operand. This advantage is achieved in an embodiment of the invention in which such an instruction F is recognized, and an intermediate "stitching" parcel is inserted to couple the results of instructions D and E into a complete register's worth of data. The intermediate stitching parcel has two operands, each the result of a single preceding instruction, D and E, respectively. The operand of F is now dependent on the result of only one preceding instruction, the "stitching" parcel. The stitching parcel can execute as soon as D and E have executed, and F only needs to wait for the stitching parcel to execute.

SUMMARY OF THE INVENTION

The invention provides a method and system for performing instructions in a microprocessor having a set of registers, in which instructions that operate on portions of a register are recognized, and "stitching" instructions are inserted into the instruction stream to couple the instructions operating on the portions of the register. The stitching parcels are serialized along with other instruction parcels, so that instructions which read from or write to portions of a register can proceed independently and out of their original order, while maintaining the results of that out-of-order operation to be the same as if all instructions were performed in the original order. In a preferred embodiment, the choice of stitching parcels is optimized to the Intel x86 architecture and instruction set.

DETAILED DESCRIPTION OF THE PREFERRED EMBODIMENT

In the following description, a preferred embodiment of the invention is described with regard to preferred process steps and data structures. Those skilled in the art would recognize, after perusal of this application, that embodiments of the invention can be implemented using circuitry or microprogramming in a microprocessor, or other structure adapted to particular process steps and data structures, and that implementation of the process steps and data structures described herein would not require undue experimentation or further invention.

Instruction Stream

Figure 1:
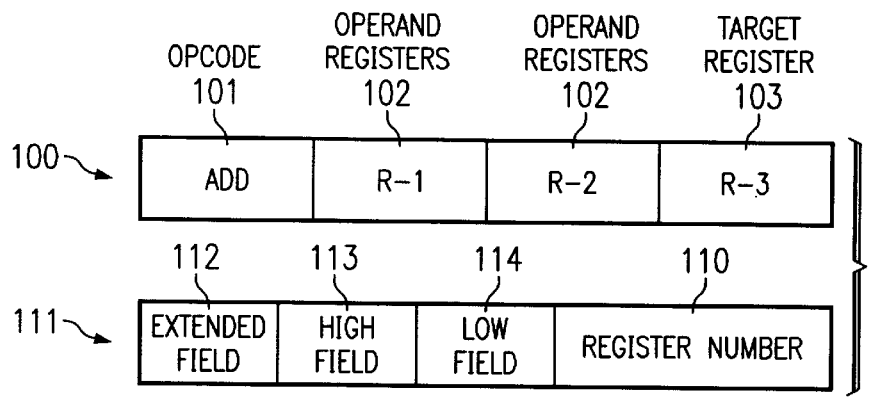
FIG. 1 is a block diagram that shows an instruction and the format of a register specifier. This example is intended to be illustrative and in no way limiting.

FIG. 1 shows the format of example instructions parcels and register specifiers. This example is intended to be illustrative only and in no way limiting.

Every instruction 100 in the instruction stream includes an opcode 101, a set of operand registers 102 and a set of target registers 103.

The set of operand registers 102 includes registers that are read by the instruction 100. In the x86 instruction set, most instructions 100 have two operand register specifiers 102.

In a preferred embodiment, each operand register specifier 102 and each target register specifier 103 exists in the form of a register specifier 110. This register specifier 110 includes a register number 111, an extended field bit 112, a high field bit 113 and a low field bit 114.

A register specifier 110 is a seven-bit quantity. The least significant four bits include the register number 111. The register specifier 110 can specify any one of a set of sixteen 32-bit registers. The extended field 112, the high field 113 and the low field 114 are each one bit. If the extended field bit 112 in an operand register specifier 102 of an instruction 100 has a value of 1, then the instruction reads the extended portion of the register indexed by the register number 111 in that operand register specifier 102. If the extended field bit 112 in the target register specifier 103 of an instruction 100 has a value of 1, then that instruction 100 writes to the extended portion of the register indexed by the register number 111 in that target register specifier 103. Likewise, if the high field bit 113 or low field bit 114 in an operand register 102 or target register specifier 103 in an instruction 100 has a value of 1, then instruction 100 reads or writes, respectively, the high or low portion, of the register indexed by the register number 111 in that register specifier.

Figure 2:
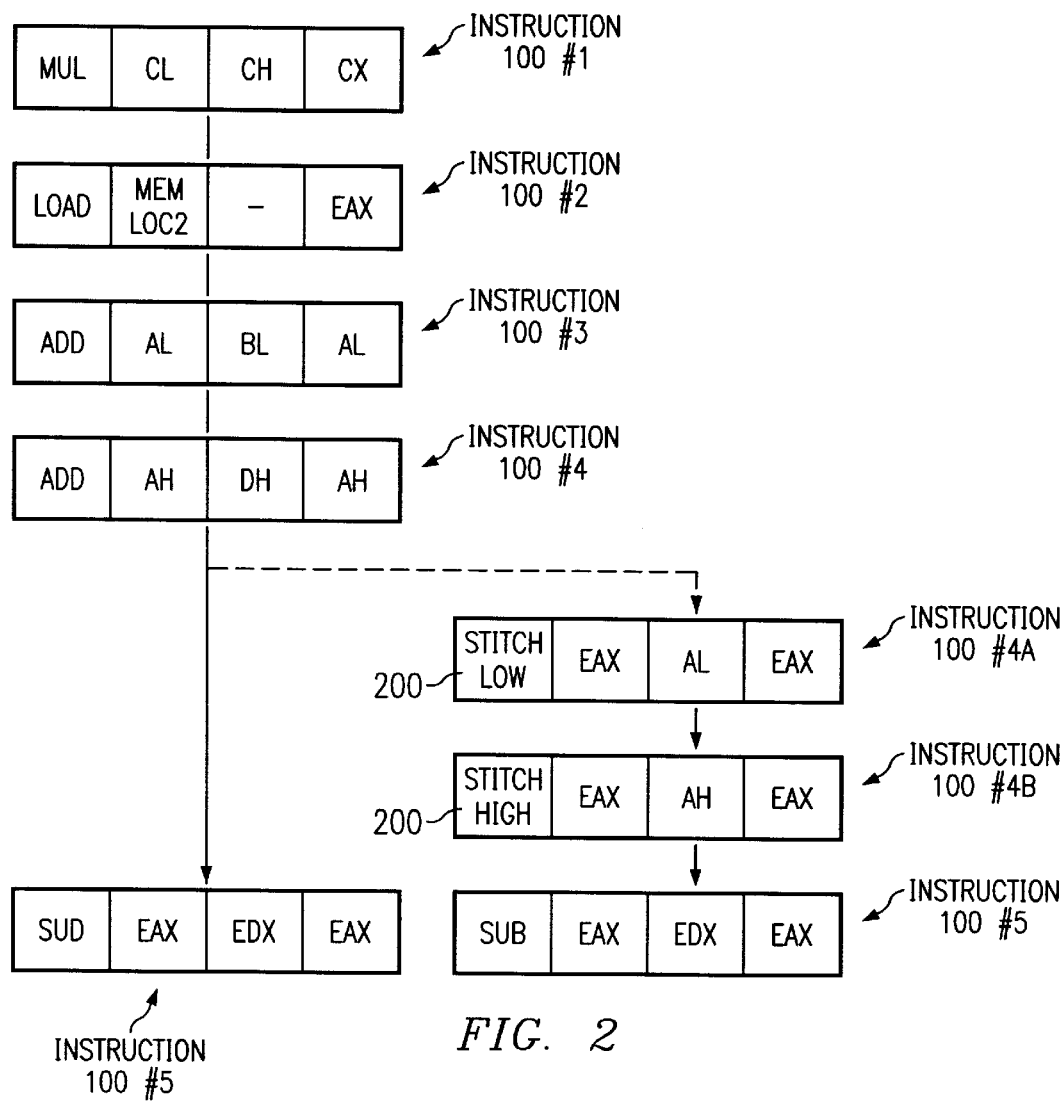
FIG. 2 shows an example stream of instructions before and after the insertion of stitching parcels. This example is intended to be illustrative and in no way limiting.

FIG. 2 shows an example stream of instructions before and after the insertion of stitching parcels. This example is intended to be illustrative and in no way limiting.

FIG. 2 includes one or more stitching parcels 200 that are inserted into a stream of instructions 100. Each instruction 100 includes an address that identifies the position of each instruction 100 in the stream of instructions. The address also indicates the location of each instruction 100 in a memory.

In this example, a first instruction 100 is at address #1. This first instruction 100 multiplies the value found in the low byte of register C, (indicated by the operand register 102 notation "CL") by the value found in the high byte of register C (indicated by "CH"). The instruction 100 writes its result into the least-significant 16 bits of register C (indicated by the target register 103 notation "CX"). Execution of this instruction 100 will take several processor cycles because multiplication is a relatively complex operation.

A second instruction 100 is at address #2. This instruction loads the value found in a memory location at address MEMLOC2 into the entire 32 bits of register A, as indicated by "EAX" as the target register 103.

A third instruction 100 is at address #3. This instruction adds the value found in the low byte of register A (as indicated by "AL" as an operand register 102), to the low byte of register B, (indicated by "BL" as an operand register 102), and writes the result back into the low byte of register A (indicated by "AL" as the target register 103).

A fourth instruction 100 is at address #4. This instruction adds the value found in the high byte of register A, (indicated by "AH" as an operand register 102) to the high byte of register D, (indicated by "DH" as an operand register 102); the result writes back into the high byte of register A (indicated by "AH" as the target register 103). This fourth instruction 100 does not depend upon the result of the third instruction 100 because this fourth instruction 100 reads from and writes to only the high byte AH of register A. Thus, the fourth instruction 100 can be executed in any order with respect to the third instruction 100.

A fifth instruction 100 is at address #5. This instruction subtracts the value found in the entire 32 bits of register D, (indicated by "EDX" as an operand register 102), from the entire 32 bits of register A (indicated by "EAX" as an operand register 102). The result is written into the entire 32 bits of register A (indicated by "EAX" as a target register 103).

If these elements existed in the prior art, the first operand register 102 specifier of instruction 100 at address #5, EAX would have three lockers, because the most recent instructions to write to the extended, low and high portions of register A were the three different instruction at #2, #3 and #4 respectively. Therefore, the instruction 100 at address #5 could not execute before the three preceding instructions.

Existing systems do not allow for the execution of an instruction 100 having more than one locker per operand register 102. In the prior art, an instruction 100 at address #5 cannot execute until all three locker instructions have retired. Instructions must be retired in the order in which they appear in the instruction stream, so those three instructions cannot retire until the time-consuming MULTIPLY instruction at address #1 has been executed and retired.

In the preferred embodiment, this delay is addressed by insertion of stitching parcels 200. A stitching parcel 200 (identified as #4A) is inserted into the instruction stream after the fourth instruction 100 and before the fifth instruction 100. This insertion is responsive to the fifth instruction 100 operating on the entire 32-bit value for register A.

Similarly, a second stitching parcel 200 (identified as #4B) is inserted into the instruction stream after the first stitching parcel 200 and before the fifth instruction 100. This insertion is responsive to the fifth instruction 100 operating on the entire 32-bit value for register A.

Execution of the first and second stitching parcels 200 has the effect of combining the results of the three preceding instructions into a single result, which is then written into a single location in the result shelf. Thus, unlike the prior art, the EAX operand of the instruction 100 #5 has only one locker, #4B and can be executed as soon as instructions 4A and 4B have been inserted and executed.

Inserting Stitching Parcels and Serialization

Figure 3:
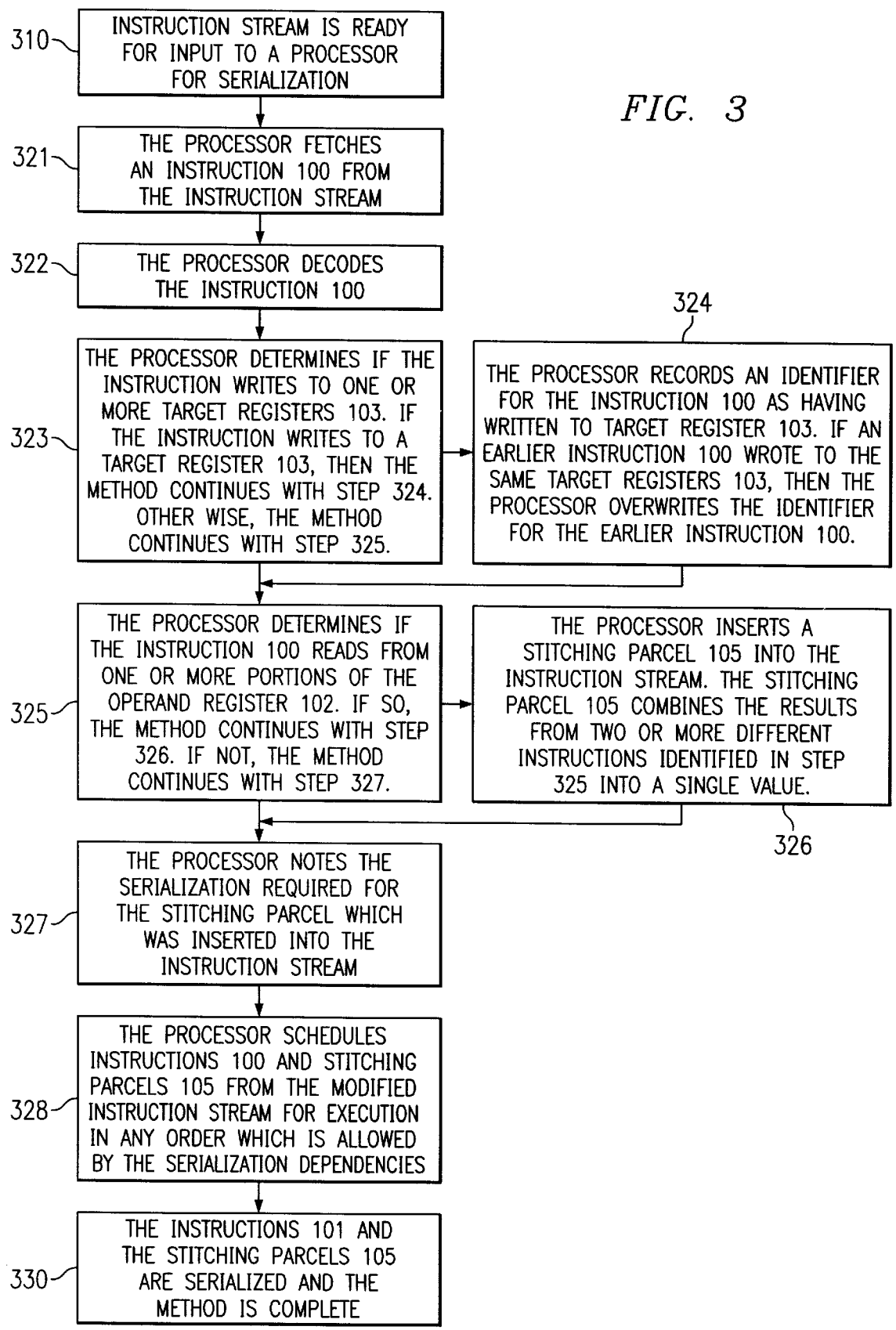
FIG. 3 is a process flow chart that shows a method for inserting and serializing stitching parcels.

FIG. 3 shows a process flow chart for inserting and serializing stitching parcels.

A method 300 for inserting and serializing stitching parcels 105 begins at a flow point 310, includes process steps 321 through 328 inclusive, and ends at a flow point 330.

The method 300 is preferably performed by a processor, or a subunit of a processor dedicated to the task of serialization of instructions. In a preferred embodiment, the processor performs all the steps 321 through 328, or at least as many as possible, in parallel for different instructions 100 in the instruction stream, in a pipelined manner.

At the flow point 310, the instruction stream is ready for input to a processor, or subunit of the processor, for serialization.

At a step 321, the processor fetches an instruction 100 from the instruction stream. In a preferred embodiment, the processor executed this step by loading the instruction 100 from a cache memory, where it has been previously loaded from a main memory.

At a step 322, the processor decodes the instruction 100.

At a step 323, the processor determines if the instruction writes to one or more target registers 103. If so, the method 300 continues with the step 324; otherwise, the method 300 continues with the step 325.

At a step 324, the processor records an identifier for the instruction 100 as having written to one or more portions of the target registers 103. If an earlier instruction 100 wrote to those same target registers 103, the processor overwrites the identifier for the earlier instruction 100 with an identifier for the newer instruction 100.

At a step 325, the processor determines if the instruction 100 reads from one or more portions of one or more operand registers 102, and if so, if those portions of those operand registers 102 were written to by two or more different instructions 100 in the instruction stream. If so, the method 300 continues with the step 326; otherwise, the method 300 continues with the step 327.

At a step 326, the processor inserts a stitching parcel 200 into the instruction stream. Each of the one or more stitching parcels 200 to be inserted combines the results from exactly two of the different instructions 100 identified in the step 325 into a single value. In a preferred embodiment, any of the following forms of stitching parcel 200 may be inserted:

Combine a low byte and a high byte to form a 16-bit value;

Combine a 32-bit value with a low byte, which replaces the low byte of the 32-bit value;

Combine a 32-bit value with a high byte, which replaces the high byte of the 32-bit value; and Combine a 32-bit value with a 16-bit value, which replaces the lower 16 bits of the 32-bit value.

At a step 327, the processor notes the serialization required for the one or more stitching parcels 200 that were inserted into the instruction stream in the step 326.

At a step 328, the processor schedules instructions 100 and stitching parcels 200 from the modified instruction stream for execution in any order which is allowed by their serialization dependencies.

At the flow point 330, the instructions 101 and the stitching parcels 105 are serialized for execution and the method 300 is complete.

Figure 4:
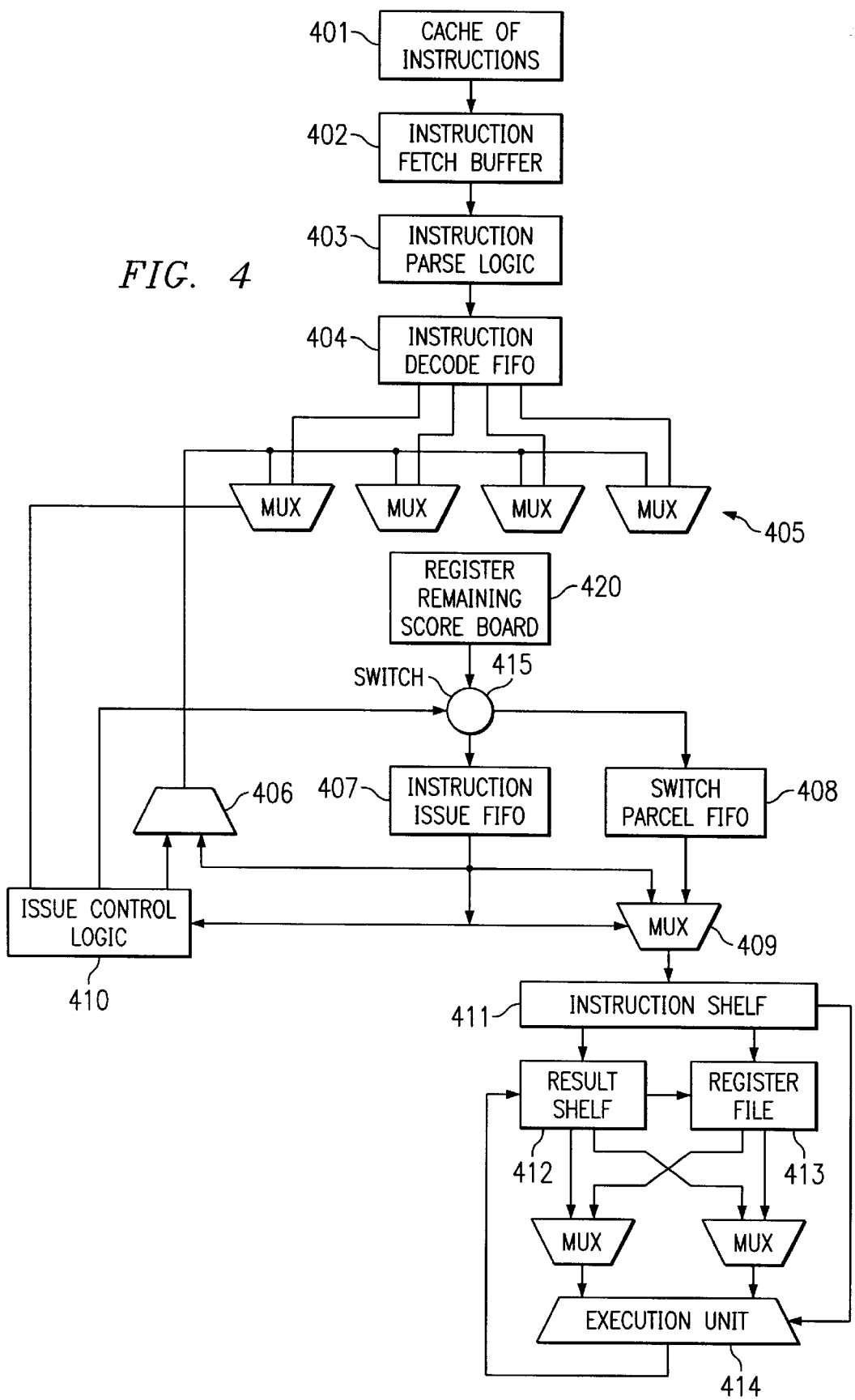
FIG. 4 is a block diagram that shows a system for identifying, executing and sequencing parcels that do not require stitching.

FIG. 4 is a block diagram that shows a system 400 whereby parcels that do not require stitching and parcels that require stitching are identified, executed and sequenced.

A system 400 includes an instruction cache 401, an instruction fetch buffer 402, an instruction parse logic 403, an instruction decode FIFO 404, four multiplexors 405, a multiplexor 406, an instruction issue FIFO 407, a stitch parcel FIFO 408, a multiplexor 409, an issue control logic 410, an instruction shelf 411, a result shelf 412, a register file 413, an execution unit 414, a switch 415 and a register renaming scoreboard 420.

The instruction fetch buffer 402 fetches a stream of instruction bytes 100 from the instruction cache 401. Instruction parse logic 403 examines the instruction bytes 100 contained in the fetch buffer 402 and parses them into a stream of variable length x86 instructions; after parsing takes place, the instruction parse logic 403 writes a copy of each instruction into instruction decode FIFO 404.

In the event execution of an instruction 100 requires two or more parcels, the instruction parse logic 403 causes multiple copies of the parse instruction to be placed into instruction decode FIFO 404.

The output of the instruction decode FIFO 404 is routed to the register renaming scoreboard 420 via the multiplexors 405 and 406. Absent the need to insert stitching parcels, the output of the register renaming scoreboard 420 is routed to the instruction issue FIFO 407 via a switch 415. If there is a need to insert a stitching parcel contained in the register renaming scoreboard 420, switch 415 will also route the output from the register renaming scoreboard 420 to the stitch parcel FIFO 408.

Major functions of the register renaming scoreboard 420 include the following activities: first, the register renaming scoreboard 420 allocates and assigns a sequential parcel identifier to parcels that do not require stitching. It does not assign an identifier to any parcel that requires stitching or to any parcel that follows a parcel that requires stitching. In the preferred embodiment, the identifier allocated and assigned by the register renaming scoreboard 420 includes a unique sequence of seven bits. Retirement logic (not shown) retires parcels in the original program order. The original program order is ascertained by looking to the identifier assigned to each parcel by the register renaming scoreboard 420. After a parcel has been retired, the parcel identifier is used to read that execution result from result shelf 412 and write the result to register file 413. This informs the register renaming scoreboard 420 that the identifier is free to be reallocated. Since the result shelf 412 is a 64 word RAM, the register renaming scoreboard 420 guarantees that no more than 64 identifiers can be assigned to parcels at any one time.

Secondly, the register renaming scoreboard 420 records the register specifier 110 of the target register 103 (if any) of each parcel to which it assigns an identifier. The target register specifier is determined from the x86 instruction by the parse logic 403; the target identifier is written into the instruction decode FIFO 404. The register renaming scoreboard 420 can tell if the parcel wrote only a portion of the target 32 bit register by looking at the target register specifier. This register specifier is the internal representation of each instruction parcel's operand registers 102 and destination register; it is commonly included in multiprocessors available from Intel, AMD and companies.

Thirdly, the register renaming scoreboard 420 determines which unretired parcel most recently wrote to each portion of the operand register 102. The register renaming scoreboard 420 makes this determination by looking to the register specifier of the target register 103 of every instruction 100. Thus, if the register renaming scoreboard 420 determines that no unretired parcel wrote to those portions of the register, then the operand value will be found in its entirety in the register file 413 if some portions of operand register 102 are needed. If two or more portions of the operand register 102 are needed and the register renaming scoreboard 420 determines that those values were not all the result of a single earlier unretired parcel, then a stitch parcel(s) is needed to get the correct value of that operand register 102.

If stitch parcels are not required, the output from the register renaming scoreboard 420 includes an indication of whether the last parcel that writes to the operand register 102 has been retired. If the last parcel that wrote to a given portion of the operand register 102 (termed the "locker" of that portion) has not been retired, then the output will include the identifier of that locker. The locker identifier of a portion of an operand register 102 is identical to both the identifier of the parcel (assigned by the register renaming scoreboard 420 in the manner described above) and the address of the result shelf 412 location in which the result is stored from the time it is computed until such time when the locker parcel is retired.

Issue control logic 410 examines the contents of instruction issue FIFO 407 and determines if any stitch parcels require insertion. As detailed above, switch 415 wrote the output of the register renaming scoreboard 420 to instruction issue FIFO 407. For each parcel that does not need stitching, issue control logic 410 causes multiplexor 409 to route that parcel directly from the instruction issue FIFO 407 to the instruction shelf 411. Instruction shelf 411 receives all parcels from either the instruction issue FIFO 407 or the stitch parcel FIFO 408. The instruction shelf 411 implements the out-of-order execution sequencing of the parcels contained in it. A parcel is ready for execution whenever the instruction shelf 411 determines that the complete value of each operand register 102 is available.

Once a parcel is ready for execution, the instruction shelf 411 sends the operation of the parcel (e.g. ADD) to the execution unit 414. The instruction shelf also sends the register identifier of each operand as a read address to register file 413. Lastly, the instruction shelf 411 sends the locker of each operand register 102 as a read address to the result shelf 412.

If issue control logic 410 discovers a parcel in the instruction issue FIFO 407 that contains one or two operand registers 102 that require stitching, the issue control logic 410 stops removing the parcels from the instruction issue FIFO 407 and sending them to the instruction shelf 411. When these activities stop, the issue control logic 410 begins a two step process to insert the stitch parcels. This two step process will be described in subsequent paragraphs. Prior to commencing that two step process, the number of stitch parcels to be inserted is determined from the contents of the instruction issue FIFO 407. Each of the two operand registers 102 in the parcel could require zero, one or two stitch parcels to be inserted, resulting in a maximum of four stitch parcels.

If portions of an operand register 102 were written by exactly two older parcels, then issue control logic 410 must create one stitch parcel for that operand register 102. If an operand register 102 needs 32 bits written by three different older parcels, then issue control logic 410 creates two stitch parcels. The first stitch parcel stitches two portions together (e.g. stitch AH and AL into a new value AX). The second stitch parcel stitches the third portion to the result of the first stitch parcel, to produce the full 32-bit value of operand register 102, which is then stored in the result shelf 412.

As indicated above, issue control 410 creates the requisite number of stitch parcels (ranging from one to four) via a two step process.

The first step of this process begins when issue control logic 410 causes multiplexors 405 and 406 to route input from the instruction issue FIFO 407 to the register renaming scoreboard 420. Issue control logic 410 also causes switch 415 to write the output of the register renaming scoreboard 420 into the stitch parcel FIFO 408 instead of instruction issue FIFO 407. The contents of issue instruction FIFO 407 are unchanged by this first step. Issue control logic also prevents any new parcels from being written into the instruction shelf 411.

The second step of this process also involves issue control 410. Issue control logic 410 causes multiplexors 406 and 405 to route the output from instruction issue FIFO 407 back to the input of register renaming scoreboard 420. Issue control logic 410 causes switch 415 to write the outputs of the register renaming scoreboard 420 to the inputs of instruction issue FIFO 407. Lastly, issue control logic 410 causes multiplexor 409 to route the output of stitch parcel FIFO 408 to the instruction shelf 411 and allows those parcels to be written into the instruction shelf.

The entire process ends when issue control logic 410 causes multiplexors 405 and 409 to return to their original positions. Issue control logic 410 causes multiplexor 405 to take input of register renaming scoreboard 420 from the instruction decode FIFO 404. Multiplexor 409 continues to take all input to the instruction shelf 411 from the stitch parcel FIFO 408. As soon as stitch parcel FIFO 408 is empty, issue control logic 410 causes multiplexor 409 to take the instruction shelf 411 input from instruction issue FIFO 407. Once multiplexors 405 and 409 have returned to these original positions, the system 400 is complete and the insertion of stitch parcels has been accomplished.

The Structure of the Register Renaming Scoreboard

Figure 5:
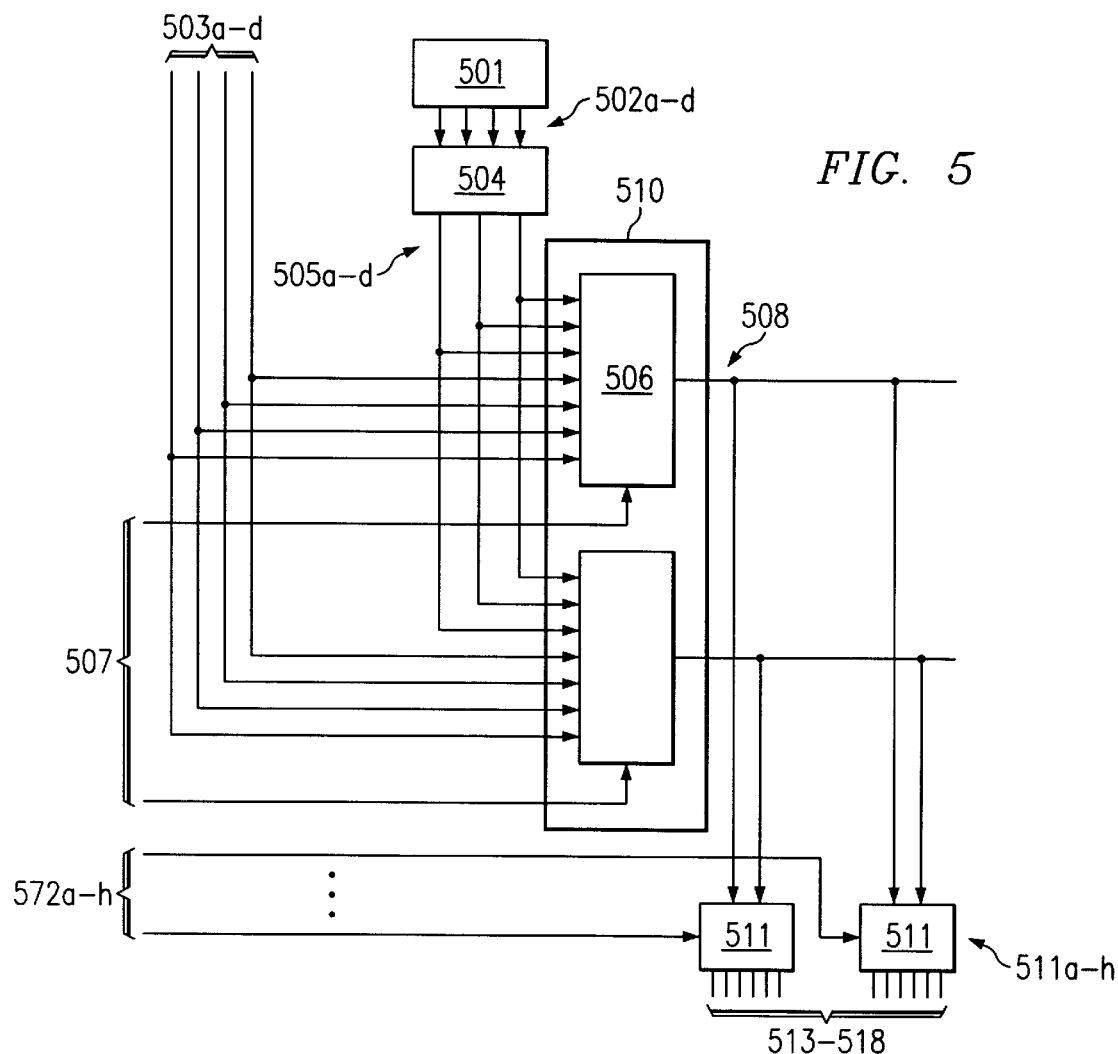
FIG. 5 is a block diagram that shows the details of the register renaming scoreboard.

FIG. 5 is a block diagram that shows the details of the register renaming scoreboard.

The register renaming scoreboard 420 includes an identifier generator 501, four parcel identifier wires 502a–502d, four register specifier wires 503a–d, a decoder 504, 64 sets of four decoder output signals 505a–505d, an array of 64 identical locker circuits 506, a set of 64 wires 507, a set of 64 register specifier wires 508, a state block 510, eight identical operand blocks 511a–h (not all shown) and eight register specifier wires 512a–h (not all shown). Each operand block 511 has six outputs 513, 514, 515, 516, 517 and 518.

Input to the identifier generator 501 is received from multiplexor 405 (not shown). The identifier generator 501 assigns four sequential identifiers ranging from 0–127 inclusive for every four parcels received from the multiplexor 405.

Parcel identifier wires 502a, 502b, 502c and 502d couple the output from the identifier generator 501 to the input of the decoder 504. Decoder 504 receives the least significant six bits from each of the four identifiers routed over these wires.

Decoder 504 decodes the four identifiers. Output from the decoder 504 includes 64 sets of four signals 505a–d. The input-output relationship implemented by the decoders 504 is as follows: all decoder output signals 505a–d are 0 except if the identifier input on wire 502a equals the integer i, then wire 505a of set i is 1, wire 505b of set i+1 (modulo 64) is 1, wire 505c of set i+2 (modulo 64) is 1, and wire 505d of set i+3 (modulo 64) is 1.

State block 510 is composed of an array of 64 identical locker circuits 506. Each locker circuit 506 is connected to a unique set of decoder outputs 505a–d. The output from multiplexors 405 (that is, the target register 103 specifiers of the four parcels) is received by all 64 locker circuits 506 via wires 503a–d. Finally, retirement logic (not shown) generates a unique clear signal, which is routed to each locker circuit 506 via the 64 wires 507. Each locker circuit 506 transmits a register identifier 508.

The output from multiplexors 405 (the two operand registers 102 of the four parcels output) is received by the eight identical operand blocks 511a–h via signals 512a–h. The specifier of the first operand register 102 of the first instruction is received by operand block 511a via signal 512a and so on. The register specifier output 508 of the ith locker circuit 506 in state block 510, I=0,63, goes to the ith register match port in each of the eight operand blocks 511a–h.

Finally, each operand block 511 has six outputs 513, 514, 515, 516, 517 and 518. Output 513 equals the parcel identifier of the locker of the lower portion of the operand register specifier 512, if any. Outputs 514 and 515 equal the parcel identifiers of the lockers of the high and extended portions, respectively of that operand register 102. Output 516 has a value of 1 if the low and high fields of the operand register 102 have different lockers. Output 517 has a value of 1 if the low and extended fields of the operand register have different lockers. Finally, output 518 has a value of 1 if the operand register 102 specifier input on 512 references two or more fields and not all of the those fields have the same lockers. This latter value indicates that the operand needs to be stitched.

Details of the 64 Locker Circuits

Figure 6:
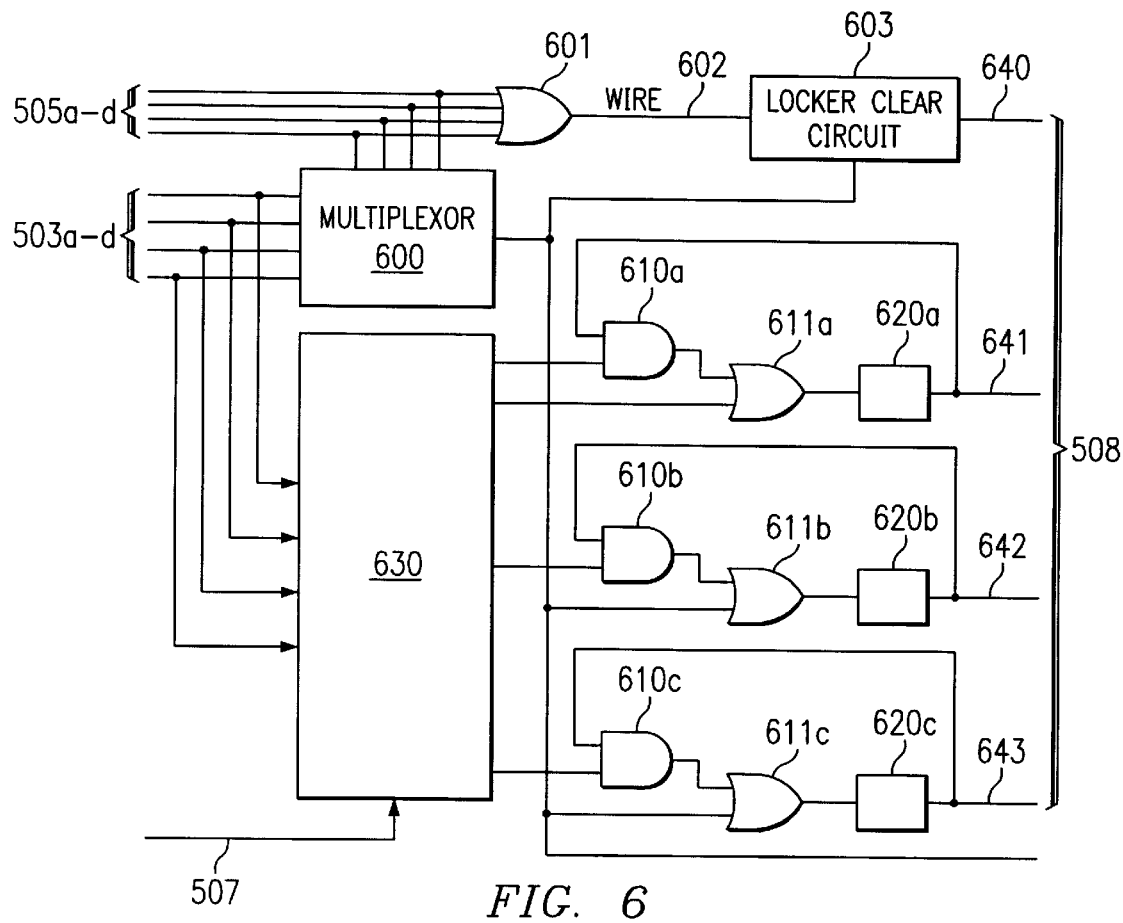
FIG. 6 is a block diagram that shows the details of one of the 64 locker circuits included in the state block.

FIG. 6 is a block diagram that shows the details of one of the 64 locker circuits included in the state block.

Each of the 64 locker circuits includes a multiplexor 600, an OR gate 601, a wire 602, a four bit register 603, three AND gates 610a–c, three OR gates 611a–c, three one bit registers 620a–c and a locker clear circuit 630.

The specifiers of target registers 103 of the four instructions at the outputs of multiplexor 405 are transmitted along wires 503a–d. Multiplexor 600 selects one of the four inputs 503a–d, based on the values on wire 505a–d. If wire 505a is a 1, then output 605 of multiplexor 600 equals the target register specifier 503a of the first instruction at the output of multiplexor 405, and so on. If all four wires 505a–d have a value of 0, then the output 605 of multiplexor 600 is all 0.

The output of OR gate 601 has a value of 1 on wire 602 if one of the control inputs 505a–d has a value of 1. If the output of OR gate 601 is zero, then all of the control inputs 505a–d have a value of 0.

Four-bit register 603 holds the register number portion of the register specifier. A clock cycle determines when the contents of register 603 change to the values routed by multiplexer 600. The contents of register 603 will change to the values routed by multiplexer 600 if the write enable input connected to wire 602 is at value 1; otherwise, the register contents are unchanged. The output from register 603 includes the register number portion of the register specifier output 508, from locker circuit 506.

One bit register 620a–c holds the youngest locker bits for the low, high and extended portions of a register. The significance of the contents of these registers is as follows: the value in register 620a in the ith locker circuit in the array of identical circuits 506 contained in state block 510, i=0 . . . 63, is 1 if the parcel with identifier i wrote to the extended part of the register numbered 640, that parcel has not retired and no parcel since that parcel wrote the extended part of that register. The values in one-bit registers 620b and 620c have the corresponding significance with respect to writing the high and low portions, respectively, of the register number 640. Outputs 641, 642 and 643 from one-bit registers 620a–c include the remainder of the output register specifier 508 of the locker circuit 506.

The values written into the youngest locker registers 620a–c are determined by AND gates 610a–c, OR gates 611a–c and the locker clear circuit 630. If the value on wire 602 is 1, then the register specifier output by multiplexor 600 is the target of the parcel having identifier i. If the extended field of that register specifier is a 1, then this parcel is writing the extended portion of the register. In this case, the OR gate 611a forces the value on the youngest locker register 620a to 1.

If the extended field of selected register specifier 605 is 0, then either no parcel having identifier i is being routed to the register renaming scoreboard 420 for that particular cycle or such parcel does not write the extended portion of a target register 103 (not all parcels write to a register). In this case, the youngest locker of the extended portion will not be forced to 1, but it could still be cleared to 0 by the locker clear circuit 630. The locker clear circuit inputs the register number 640, the target register 103 specifiers 503a–d of all four parcels that are inputs to the register renaming scoreboard 420 and a unique one of the 64 locker clear signals 507.

Details of the Locker Clear Circuit

Figure 7:
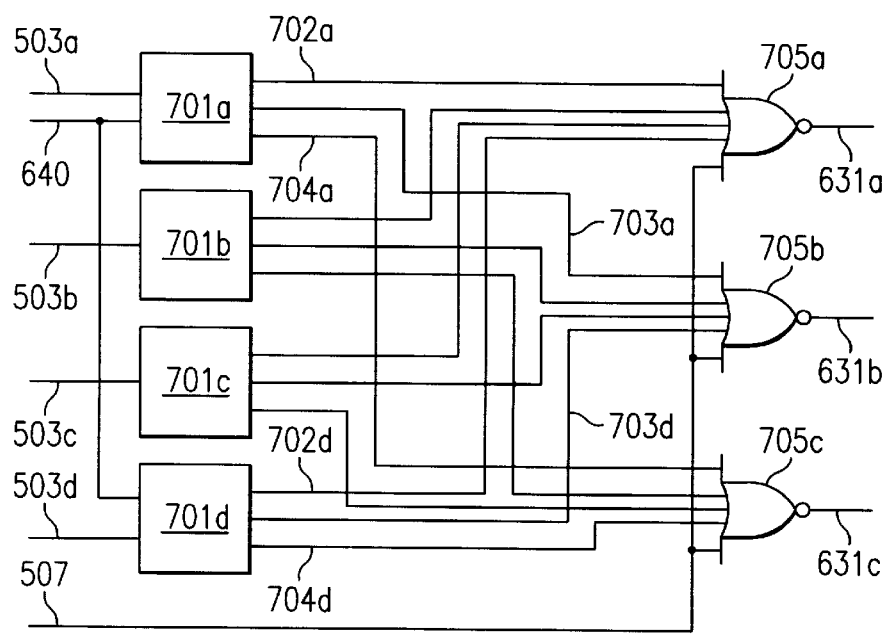
FIG. 7 is a block diagram that shows the structure of a locker clear circuit.

FIG. 7 is a block diagram that shows the structure of the locker clear circuit.

Each locker clear circuit 630 includes four identical target clear blocks 701a–d, three sets of four output signals 702a–d, 703a–d and 704a–d, and three NOR gates 705a–c.

Each locker clear circuit 630 inputs a unique one of the 64 retire signals 507. Input 507 to locker circuit i, i=0 . . . 63, is 1 when retirement logic (not shown) determines that the parcel with identifier i is retiring. Since the register renaming scoreboard 420 stores information only about unretired lockers, all three NOR gates 705a–c unconditionally output a 0 when retire signal 507 is 1. This clears the three youngest locker registers 620a–c.

Each of the identical target clear blocks 701a–d in the locker clear circuit 630 included in a locker circuit 506 inputs both (1) the register specifier register number 640 that is stored in that locker clear circuit 506 and (2) the four target register specifiers 503a–d that are input to the register renaming scoreboard 420. Output 702*a* of the target clear block 701*a* is 1 if the first instruction at the output of multiplexor 405 writes to the extended portion of the register whose number 640 is stored in this locker circuit. Similarly, outputs 703*a* and 704*a* are 1 if the first instruction at the output of multiplexor 405 writes to the high or low portion, respectively of that target register 103. Outputs 702*b–d*, 703*b–d* and 704*b–d* are 1 if the corresponding second, third or fourth instructions at the output of the multiplexor 405 write to the extended, high or low portion, respectively, of that register.

The record contained in the register renaming scoreboard 420 of the most recent instruction to write to the extended portion of a register is erased if any of the four instructions at the output of multiplexor 405 write to the extended portion of that register. This happens when a more recent instruction (specifically, the output of multiplexor 405) writes to the same portion of that register. Under such circumstances, at least one of the outputs from the target clear blocks will be a 1, forcing the output 631*a* of NOR gate 705*a* to 0. This erases any 1 from register 620*a*. Similar reasoning applies to the high and low register portions, which are cleared by the outputs 631*b* and 631*c* of NOR gates 705*b* and 705*c* respectively.

Figure 8:
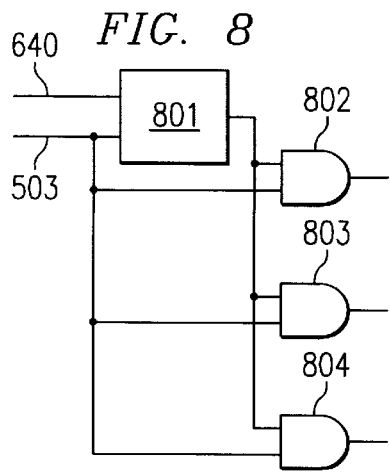
FIG. 8 is a block diagram that shows details of the target clear circuit contained in the locker clear circuit.

FIG. 8 is a block diagram that shows the structure of the four identical target clear blocks.

As indicated above, each of the four identical target clear blocks 701*a–d* is included in the locker clear circuit 630. Each target clear block 701*a–d* includes a 4-bit comparator 801 and three AND gates 802, 803 and 804.

The comparator 801 compares the 4-bit register number 640 stored in register 603 to the register number portion of the register specifier 503. The output of comparator 801 is 1 if the register specifier 503 equals the register number 640. Register specifier 503 specifies the target register 103 of one of the four instructions at the output of multiplexor 405. If under these conditions the register specifier 503 extended field is 1 (indicating that the instruction writes the extended portion of that register), then the output 702 of AND gates 802 is 1. Similarly, AND gates 803 and 804 will output 1 if the register specifier 503 indicates that the instruction writes the high and low portions, respectively, of that register.

Details of the Eight Operand Blocks

Figure 9:
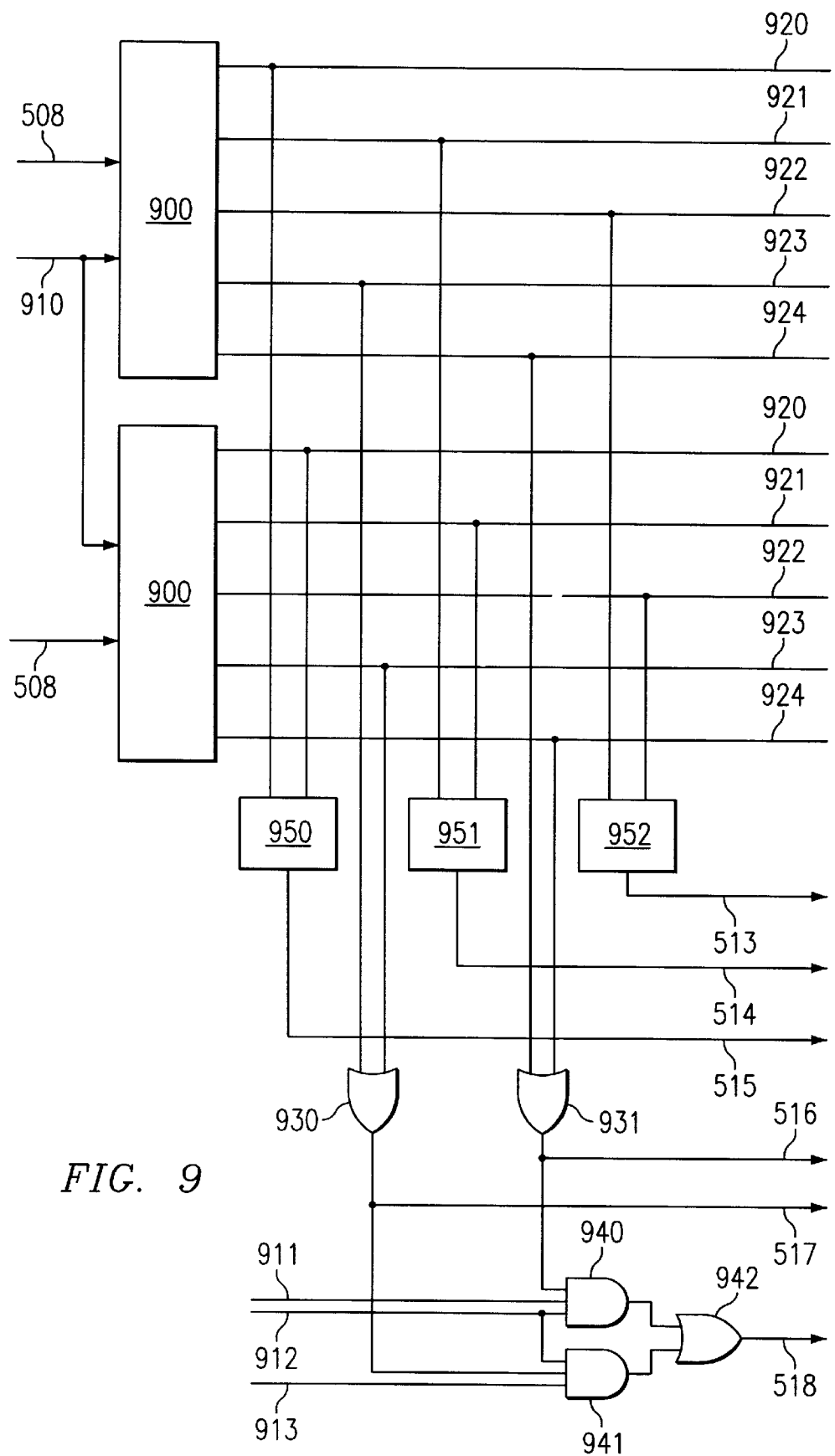
FIG. 9 is a block diagram that shows the structure of one of the eight identical operand blocks included in the state block.

FIG. 9 is a block diagram that shows the structure of the eight identical operand blocks included in the state block.

Each of the eight identical operand blocks 511 includes a set of 64 identical operand search circuits 900 (not all 64 circuits shown), wires 910, 911, 912, and 913, 64 sets of five signals 920, 921, 922, 923 and 924 (not all 64 sets shown), two 64-input OR gates 930 and 931, logic gates 940, 941 and 942, and three identical encoders 950, 951 and 952.

Each of the eight identical operand blocks 511 inputs a unique one of the eight operand register specifiers 512*a–h*. The operand register specifier 512 is broken up into the register number portion 910, the extended field specifier bit 911 and the high and low field specifiers bit 912 and 913, respectively.

Wire 910 carries the number of the operand register 102 to all 64 of the identical operand search circuits 900. The output 508 of the ith locker circuit 506, i=0 . . . 63 is connected to the input of the ith operand search circuit 900. The outputs of the ith operand search circuit include (1) one of the 64 signals 920, (2) one of the 64 signals 921, (3) one of the 64 signals 922, (4) one of the 64 signals 923 and (5) one of the 64 signals 924. Output signal 920 of the ith operand search circuit has a value of 1 if the parcel with identifier i was the last unretired parcel to write to any part of the register whose number is carried by wire 910. At most, one of the 64 wires 920 will be a one, as there can be no more than one most recent parcel to write to a given register. Encoder 950 inputs all 64 signals 920 and outputs the binary representation of the integer i as wire 515.

Similarly, each of output signals 921 and 922 of the ith operand search circuit, i=. . . 63, has a value of 1 if the parcel with identifier i was the last unretired parcel to write to the high and low portions, respectively, of the register whose number is carried by wire 910. Encoders 951 and 952 input all 64 signals 921 and all 64 signals 922, respectively and output the binary representations 513 and 514 of the identifiers of the lockers of the low and high portions, of the operand register whose number is carried by signal 910.

Output signal 923 of the ith operand search circuit, i=. . . 63, has a value of 1 if the parcel with identifier i wrote to only one of the high and low parts of the operand register whose number was carried by signal 910. Output signal 924 of the ith operand search circuit, i=. . . 63 has a value of 1 if the parcel with identifier i wrote to only one of the extended and low parts of the operand register whose number is carried by signal 910. The set of 64 signals 923 created by the 64 operand search circuits 900 are connected by OR gate 930. Similarly, the set of 64 signals 924 created by the 64 operand search circuits 900 are connected by OR gate 931. Outputs from OR gates 930 and 931 are the outputs 516 and 517 from the operand block 511. If signal 516 is a 1, then the low and extended portions of the operand register have different lockers. If signal 517 is a 1, then the low and high portions of the operand register have different lockers.

If the operand register specifier specifies both the low field and the high field (signals carried along wires 912 and 913) of a register and either (1) the most recent parcel to write any part of the register wrote only one of the low or high parts (signal 517 is a 1) or (2) the operand register specifier also specifies the extended field (wire 911) and the most recent parcel to write any part of the register wrote only one of the low or extended parts (signal 516 is a 1), then the value 518 output from operand search circuit 700 is a 1. Such a value indicates that a stitch parcel is needed to accumulate the complete value of the operand register. Gates 940, 941 and 942 perform this logic. Signals 516 and 517 are output to the issue control logic 410 to tell it how many stitch parcels must be generated for this operand and which portions of the register need to be stitched together.

Figure 10:
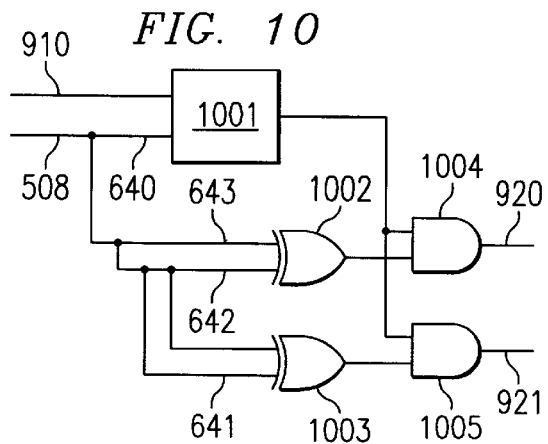
FIG. 10 is a block diagram that shows one of the 64 identical operand search circuits included in each of the eight identical operand blocks.

FIG. 10 is a block diagram that shows one of the 64 identical operand search circuits.

Each of the 64 identical operand search circuits 900 includes a wire 910, a register specifier 508, a four bit comparator 1001, exclusive OR gates 1002 and 1003, AND gates 1004 and 1005, and output signals 920 and 921.

One of the input signals received by the identical operand search circuits 900 is the register number portion carried by wire 910 of the operand register specifier 512. Another input received by the identical operand search circuits 900 is register specifier 508 output by a unique one of the identical locker circuits 506, having an identifier i in the range 0 through 63. As noted before in FIG. 6, the register specifier 508 is composed of register number 640, extended field bit 641, high field bit 642, and low field bit 643 . Bit 641 will be 1 if the most recent parcel to write the register number 640 had identifier i and wrote to the extended part of that register. The value of bits 642 and 643 are 1 if the most recent parcel to write that register had identifier i and wrote the high or low parts of the register, respectively.

The value of the output of comparator 1001 will be 1 if the operand register 102 number carried by wire 910 is equal to that stored in register 603, as conveyed by wire 640. Exclusive OR gate 1003 determines if the instruction with identifier i wrote only one of the low and high parts of the register. AND gate 1004 outputs 1 if that instruction wrote to only one of the low and high parts of the operand register 102 number carried by wire 910. Similarly, exclusive OR gate 1003 and AND gate 1005 combine to output a 1 if that instruction wrote to only one of the extended and low parts of that operand register 102.

What is claimed is:

1. In a processor having a set of registers and means for performing a least one partial-register instruction, apparatus including
   - means for receiving an original sequence of instructions to be performed by said processor;
   - means for recognizing said at least one partial-register instruction in said original sequence;
   - means for generating at least one stitching parcel in response to said partial register instruction and for generating a modified sequence of instructions including said at least one stitching parcel; and
   - means for performing said modified sequence of instructions in a serialized order, whereby an effect of said means for performing is equivalent to performing said original sequence.

2. Apparatus as in claim 1, wherein said at least one partial-register instruction includes an instruction for reading or writing a least significant byte of a register.

3. Apparatus as in claim 1, wherein said at least one partial-register instruction includes an instruction for reading or writing an upper half of a register.

4. Apparatus as in claim 1, wherein said means for generating includes
   - means for recording, for each portion of each said register, at each point in said original sequence, a first instruction which last wrote to said portion;
   - means for detecting for each portion of each said register, at each point in said original sequence, a second instruction which later reads from said portion; whereby said stitching parcel provides a dependency between said first instruction and said second instruction.

5. Apparatus as in claim 4, wherein said means for performing includes
   - means for serializing said first instruction before said stitching parcel; and
   - means for serializing said stitching parcel before said second instruction.

6. Apparatus as in claim 1, wherein said stitching parcel follows said partial register instruction in said modified sequence.

7. Apparatus as in claim 1, wherein said partial-register instruction writes to a portion of a register.

8. Apparatus as in claim 7 wherein said stitching parcel reads said portion of said register written by said partial-register instruction and a different portion of same said register.

9. Apparatus as in claim 8, wherein said stitching parcel writes to those portions of said register from which it read.

10. Apparatus as in claim 1 wherein said means for generating includes
    - means for recording, for each portion of each register in said register set at each point in said original sequence, a first instruction which last wrote to said portion;
    - means for detecting, for each instruction following said first instruction in said original sequence, and for each portion of each register, whether said following instruction reads said portion of said register written by said first instruction, and also reads a second portion of said register not written by said first instruction, whereby said stitching parcel reads both portions of said register.

11. Apparatus as in claim 10, wherein said means for performing includes
    - means for serializing said stitching parcel after said first instruction; and
    - means for serializing said following instruction after said stitching parcel.

12. Apparatus as in claim 11, wherein each instruction in said original sequence reads one or more operands, each operand being one or more portions of a register from said register set.

13. Apparatus as in claim 12, wherein said following instruction reading a single one of said one or more operand registers requires reading both said portion of said register written by said first instruction and said second portion of said register not written by said first instruction.

14. Apparatus as in claim 13 wherein a first of said one or more operands of said stitching parcel is exactly said portion of said register written by said first instruction.

15. Apparatus as in claim 14, wherein others of said one or more operands of said stitching parcel are exactly one or more other portions of said register not written by said first instruction.

16. Apparatus as in claim 15, wherein said stitching parcel writes to exactly those portions of said register from which it reads.

17. Apparatus as in claim 16, wherein as regards each operand of each instruction following said first instruction in said modified sequence, said first instruction writes to all portions of said register that are read by said operand.

18. Apparatus as in claim 17 where said means for performing includes means for retiring each instruction in said modified sequence by writing the result of said each instruction, if any, into a register file.

19. Apparatus as in claim 18, wherein said means for recording also records whether or not said first instruction has been retired.

20. Apparatus as in claim 19, wherein said means for generating generates a stitch parcel for said following instruction only if, for some portion of said register read by said following instruction, said first instruction that last wrote said register portion has not retired.

21. In a processor having a set of registers and means for performing a least one partial-register instruction, a method including the steps of
    - receiving an original sequence of instructions to be performed by said processor;
    - recognizing said at least one partial-register instruction in said original sequence;
    - generating at least one stitching parcel in response to said partial register instruction and for generating a modified sequence of instructions including said at least one stitching parcel; and
    - performing said modified sequence of instructions in a serialized order, whereby an effect of said means for performing is equivalent to performing said original sequence.

22. A method as in claim 21, wherein the step of recognizing includes the step of reading or writing a least significant byte of a register.

23. A method as in claim 21, wherein the step of recognizing includes the step of reading or writing an upper half of a register.

24. A method as in claim 21, wherein the step of generating includes the steps of recording, for each portion of each said register, at each point in said original sequence, a first instruction which last wrote to said portion; and detecting for each portion of each said register, at each point in said original sequence, a second instruction which later reads from said portion; whereby said stitching parcel provides a dependency between said first instruction and said second instruction.

25. A method as in claim 21, wherein the step of performing includes the steps of serializing first instruction before said stitching parcel; and serializing said stitching parcel before said second instruction.

* * * * *